US012809962B2

(12) United States Patent
Aiba

(10) Patent No.: US 12,809,962 B2
(45) Date of Patent: Nov. 24, 2026

(54) RELAY DEVICE, INFORMATION PROCESSING METHOD, AND IN-VEHICLE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shinichi Aiba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 37 days.

(21) Appl. No.: 18/878,813

(22) PCT Filed: Jun. 9, 2023

(86) PCT No.: PCT/JP2023/021590
§ 371 (c)(1),
(2) Date: Dec. 24, 2024

(87) PCT Pub. No.: WO2024/004594
PCT Pub. Date: Jan. 4, 2024

(65) Prior Publication Data
US 2025/0384126 A1 Dec. 18, 2025

(30) Foreign Application Priority Data
Jun. 28, 2022 (JP) ................................. 2022-103913

(51) Int. Cl.
*G06F 21/50* (2013.01)
*G06F 21/55* (2013.01)
(Continued)

(52) U.S. Cl.
CPC ............ *G06F 21/50* (2013.01); *G06F 21/554* (2013.01); *H04L 12/28* (2013.01); *H04L 12/46* (2013.01);
(Continued)

(58) Field of Classification Search
CPC ........ G06F 21/50; G06F 21/55; G06F 21/554; G06F 21/552; G06F 21/566; H04W 12/10;
(Continued)

(56) References Cited

U.S. PATENT DOCUMENTS 10,681,191 B2 * 6/2020 Kurauchi ................ H04L 69/40
2015/0066239 A1 * 3/2015 Mabuchi ............... H04L 12/403 701/1

(Continued)

OTHER PUBLICATIONS

International Search Report, Application No. PCT/JP2023/021590, mailed Aug. 15, 2023. ISA/Japan Patent Office.

*Primary Examiner* — Shaqueal D Wade-Wright
(74) *Attorney, Agent, or Firm* — Brooks Kushman P.C.

(57) ABSTRACT

Disclosed is a relay device mounted in a vehicle and communicably connected to a plurality of in-vehicle ECUs, the relay device including: a plurality of communication units configured to be connected to the in-vehicle ECUs; and a control unit configured to perform control relating to relaying of communication data transmitted and received between the in-vehicle ECUs via the communication units, wherein the plurality of in-vehicle ECUs include a monitoring ECU having a monitoring function for the communication data, the control unit is configured to: acquire the communication data via the communication units; extract, from the acquired communication data, signal information used by the monitoring ECU to detect unauthorized data; and output, to the monitoring ECU, generated data generated based on the extracted signal information.

11 Claims, 5 Drawing Sheets

(51) Int. Cl.

| | |
|---|---|
| ***H04L 12/28*** | (2006.01) |
| ***H04L 12/46*** | (2006.01) |
| ***H04W 12/106*** | (2021.01) |
| ***H04W 12/122*** | (2021.01) |
| ***H04W 12/125*** | (2021.01) |
| *H04L 43/02* | (2022.01) |

(52) U.S. Cl.
CPC ....... *H04W 12/106* (2021.01); *H04W 12/122* (2021.01); *H04W 12/125* (2021.01); *G06F 2221/034* (2013.01); *H04L 43/02* (2013.01)

(58) Field of Classification Search
CPC . H04W 12/106; H04W 12/12; H04W 12/122; H04W 12/125; H04W 4/48; H04W 4/44; H04L 12/28; H04L 12/46; H04L 43/02
See application file for complete search history.

(56) References Cited

U.S. PATENT DOCUMENTS

| | | | | |
|---|---|---|---|---|
| 2017/0026386 | A1* | 1/2017 | Unagami | H04L 12/40032 |
| 2017/0134358 | A1* | 5/2017 | Takada | H04W 12/069 |
| 2018/0294991 | A1 | 10/2018 | Tsurumi et al. | |
| 2018/0314571 | A1 | 11/2018 | Tanabe et al. | |
| 2020/0145251 | A1* | 5/2020 | Hass | G06F 11/076 |
| 2021/0185070 | A1 | 6/2021 | Jeon et al. | |
| 2022/0038307 | A1* | 2/2022 | Yasunori | B60W 60/001 |
| 2022/0284741 | A1* | 9/2022 | Shiba | G07C 5/0841 |
| 2023/0006860 | A1 | 1/2023 | Aiba et al. | |

* cited by examiner

| Monitoring ECU ID | Segment number | Transmission periodicity [ms] | Signal to be extracted (message ID: storage bit address) |
|---|---|---|---|
| IDS-1 | 1 | t1 | 51:3-5 / 51:7-9 / 62:4-6 / 73:7-8 |
| IDS-2 | 2 | t2 | 21:8-9 / 31:3-5 |
| IDS-3 | 4 | t3 | 99:1-4 |
| · | · | · | ····· |

RELAY DEVICE, INFORMATION PROCESSING METHOD, AND IN-VEHICLE SYSTEM

CROSS-REFERENCE TO RELATED APPLICATIONS

This application is the U.S. national stage of PCT/JP2023/021590 filed on Jun. 9, 2023, which claims priority of Japanese Patent Application No. JP 2022-103913 filed on Jun. 28, 2022, the contents of which are incorporated herein.

TECHNICAL FIELD

The present disclosure relates to a relay device, an information processing method, and an in-vehicle system.

BACKGROUND

Conventionally, the CAN communication protocol is widely used for communication between a plurality of in-vehicle electronic control units (ECUs) mounted in a vehicle. With an increase in the number and the sophistication of vehicle functions, the number of in-vehicle ECUs mounted in a vehicle tends to increase, and the in-vehicle ECUs are divided into groups (segments) to form a vehicle network. The plurality of in-vehicle ECUs in the same group are connected by a common communication line, and transmit and receive data to and from one another, and the transmission and reception of data between in-vehicle ECUs in different groups is relayed by an in-vehicle relay device (gateway) (e.g., JP 2013-131907A). The vehicle network of JP 2013-131907A includes, in addition to the in-vehicle relay device (gateway), a vehicle network monitoring device connected to each of the segments of the vehicle network, and configured to detect unauthorized data (message) flowing through the vehicle network. When unauthorized data (message) has been detected, the vehicle network monitoring device transmits warning information (message code) to in-vehicle control devices (in-vehicle ECUs).

In the case of the in-vehicle relay device (gateway) of JP 2013-131907A, no consideration is given to transmitting, to the vehicle network monitoring device connected to the segments, effective information for the vehicle network monitoring device to detect unauthorized data (message).

An object of the present disclosure is to provide a relay device or the like that is capable of transmitting information used by a monitoring ECU (monitoring device) to detect unauthorized data.

SUMMARY

A relay device according to an aspect of the present disclosure is a relay device mounted in a vehicle and communicably connected to a plurality of in-vehicle ECUs, the relay device including: a plurality of communication units configured to be connected to the in-vehicle ECUs; and a control unit configured to perform control relating to relaying of communication data transmitted and received between the in-vehicle ECUs via the communication units, wherein the plurality of in-vehicle ECUs include a monitoring ECU having a monitoring function for the communication data, the control unit is configured to: acquire the communication data via the communication units; extract, from the acquired communication data, signal information used by the monitoring ECU to detect unauthorized data; and output, to the monitoring ECU, generated data generated based on the extracted signal information.

EFFECTS

According to an aspect of the present disclosure, it is possible to provide a relay device or the like that is capable of transmitting information used by a monitoring ECU to detect unauthorized data.

BRIEF DESCRIPTION OF DRAWINGS

FIG. 2 is a block diagram illustrating an internal configuration of the relay device or the like.

DETAILED DESCRIPTION OF PREFERRED EMBODIMENTS

Figure 1:
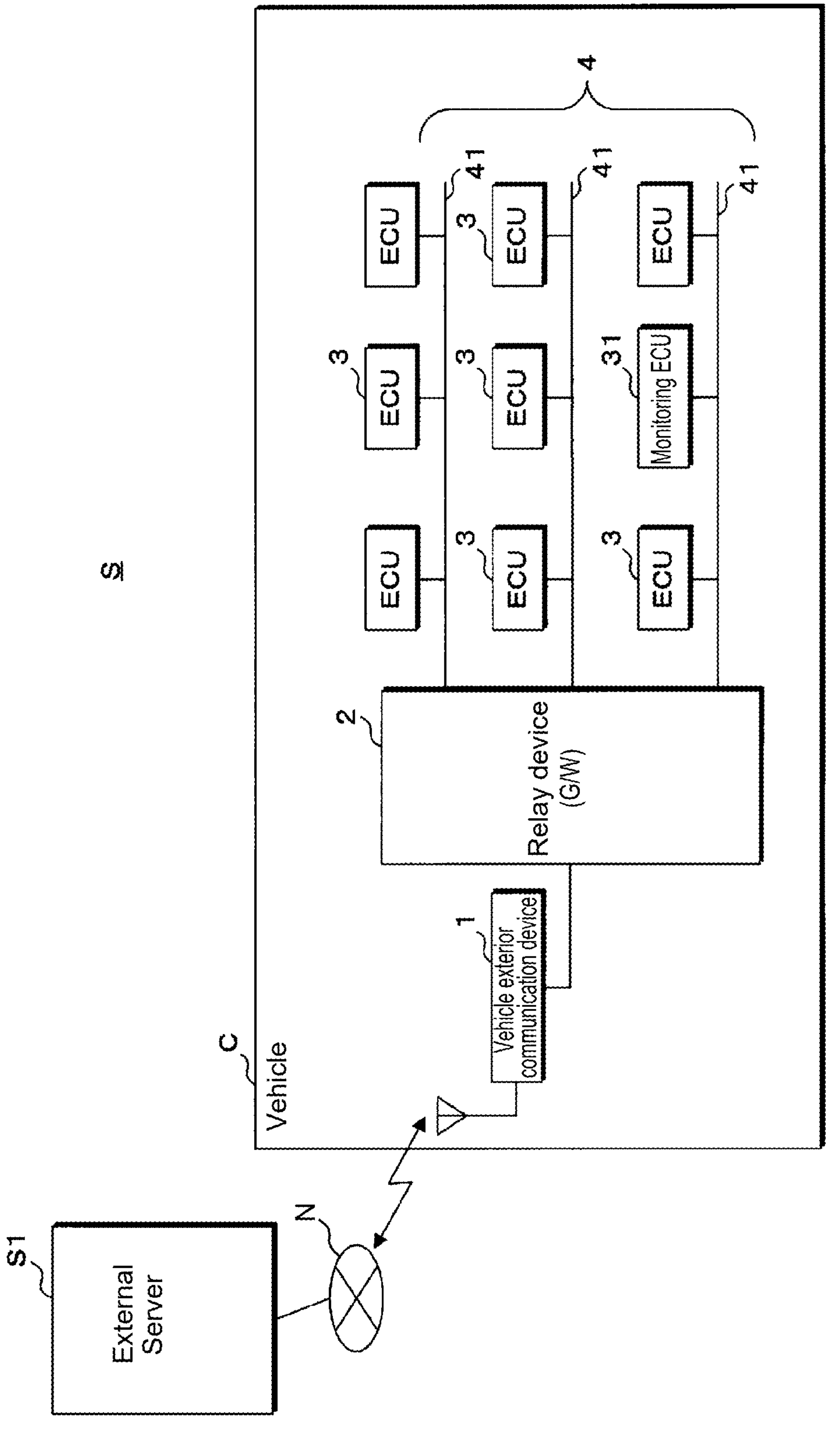
FIG. 1 is a schematic diagram illustrating a configuration of an in-vehicle system including a relay device according to Embodiment 1.

First, embodiments of the present disclosure will be listed and described. At least some of the aspects described below may be combined freely.

A relay device according to an aspect of the present disclosure is a relay device mounted in a vehicle and communicably connected to a plurality of in-vehicle ECUs, the relay device including: a plurality of communication units configured to be connected to the in-vehicle ECUs; and a control unit configured to perform control relating to relaying of communication data transmitted and received between the in-vehicle ECUs via the communication units, wherein the plurality of in-vehicle ECUs include a monitoring ECU having a monitoring function for the communication data, the control unit is configured to: acquire the communication data via the communication units; extract, from the acquired communication data, signal information used by the monitoring ECU to detect unauthorized data; and output, to the monitoring ECU, generated data generated based on the extracted signal information.

According to such an aspect, one or more in-vehicle ECUs are connected to each of the plurality of communication unit included in the relay device, and the control unit of the relay device performs control (processing) relating to relaying of the communication data transmitted and received between the in-vehicle ECUs respectively connected to the communication units. One of the plurality of in-vehicle ECUs communicably connected to the relay device functions as a monitoring ECU having a monitoring function for the communication data. The monitoring ECU may function as an Intrusion Detection System (IDS) that determines whether communication data acquired (received) by the ECU itself (monitoring ECU) is unauthorized data, and detects an intrusion by an unauthorized program or device into the in-vehicle network to which the relay device and the in-vehicle ECUs are connected. The control unit of the relay device extracts, from the communication data acquired by all the communication units included in the relay device itself, the signal information used by the monitoring ECU to detect unauthorized data. Also, the control unit of the relay device outputs to the monitoring ECU, the generated data generated based on the extracted signal information, and therefore can efficiently transmit effective information for the monitoring device to detect unauthorized data. The communication lines respectively connected to the plurality of communication units included in the relay device respectively form a plurality of segments. Since the monitoring ECU is connected to one of the segments (communication lines), it is possible to acquire only the communication data flowing (transmitted) through that segment (communication line). In contrast, the control unit of the relay device outputs, to the monitoring ECU, generated data that has been generated using the signal information extracted from the communication data acquired from all of the communication units, or in other words, all of the segments (communication lines). This enables the monitoring ECU to acquire the signal information included in communication data that cannot be directly acquired (received), thus efficiently achieving the monitoring function for the communication data.

In a relay device according to an aspect of the present disclosure, the monitoring ECU is configured to determine whether the acquired communication data is unauthorized data, using another signal information having a correlation with the signal information included in the communication data, and the signal information extracted by the control unit corresponds to the other signal information.

According to such an aspect, the monitoring ECU determines whether the acquired communication data is unauthorized data, using another signal information having a correlation, for example, an absolute value of a correlation coefficient of 0.7 or more, with the signal information included in the communication data, thereby monitoring the communication data. Depending on the connection configuration or the network topology of the in-vehicle ECUs in an in-vehicle network, there is concern that communication data including another signal information having a correlation with the monitoring target of a monitoring ECU, or in other words a signal included in the communication data to be determined whether it is unauthorized cannot be acquired by the monitoring ECU. Even in such a case, the signal information extracted by the control unit corresponds to another signal information having a correlation of a predetermined value or more (e.g., an absolute value of a correlation coefficient of 0.7 or more). Accordingly, it is possible to efficiently transmit effective information (generated data including the other signal information) used by the monitoring device to detect unauthorized data.

In a relay device according to an aspect of the present disclosure, when a request signal has been acquired from the monitoring ECU, the control unit is configured to: extract the signal information from the acquired communication data in accordance with the request signal; and output, to the monitoring ECU, the generated data generated based on the extracted signal information.

According to such an aspect, the control unit of the relay device generates and outputs the generated data including the signal information in accordance with a request (request signal) from the monitoring ECU, thus making it possible to support various types of monitoring ECUs for a general-purpose use. Furthermore, the relay device can timely respond to a request from the monitoring ECU, thus suppressing an increase in the processing load due to, for example, an excessive amount of generated data being output to the monitoring ECU.

In a relay device according to an aspect of the present disclosure, the control unit is configured to: determine, based on the acquired request signal, whether or not acquisition of communication data including the other signal information to be extracted is possible; if it is determined that the acquisition is possible, output the generated data to the monitoring ECU; and, if it is determined that the acquisition is not possible, notify the monitoring ECU that the generated data cannot be output.

According to such an aspect, when a request signal has been acquired from the monitoring ECU, the control unit of the relay device determines whether the communication data including the signal information (another signal information to be extracted) requested by the request signal can be acquired. When the communication via the in-vehicle network is performed via, for example, a Controller Area Network (CAN) or a CAN-FD, the request signal from the monitoring ECU include a CAN-ID (message ID) indicating an object to extracted, and a storage bit address where the signal information is stored in a payload of a message with the CAN-ID. The control unit of the relay device determines, by referring to route information (routing table) stored, for example, in the storage unit, whether the message with the CAN-ID including the signal information requested by the request signal is included in the route information (routing table). The route information (routing table) is information that is referred to by the control unit of the relay device when performing relay processing, and the control unit determines that the communication data on the CAN-ID included in the route information (routing table) can be acquired. The control unit determines that communication data on the CAN-ID that is not included in the route information (routing table) cannot be acquired. If it is determined that the acquisition is not possible, the control unit notifies the monitoring ECU that the generated data cannot be output, and it is therefore possible to prevent the monitoring ECU from unnecessarily waiting for that generated data.

In a relay device according to an aspect of the present disclosure, the control unit is configured to: acquire a plurality of pieces of the communication data; extract the signal information from each of the plurality of pieces of the communication data; and generate the generated data based on the extracted plurality of pieces of the signal information.

According to such an aspect, the control unit of the relay device extracts signal information from each of the plurality of pieces of the acquired communication data, thereby extracting a plurality of pieces of signal information. Since a single piece of generated data is generated using the plurality pieces of signal information, a plurality of pieces of signal information required to detect unauthorized data by the monitoring ECU can be packaged and output (transmit) to the monitoring ECU. By transmitting, to the monitoring ECU, the generated data obtained by packaging a plurality of pieces of signal information in this manner, it is possible to increase the efficiency of the processing performed by the monitoring ECU to acquire the plurality pieces of signal information, thus reducing the processing load associated with the detection of unauthorized data.

In a relay device according to an aspect of the present disclosure, the control unit is configured to, if a plurality of pieces of the communication data for extracting the plurality of pieces of the signal information have been acquired within a predetermined period, generate the generated data based on the extracted plurality of pieces of the signal information.

According to such an aspect, even in the case where the types of the signal information included in the communication data are the same (the same CAN-ID and the storage bit address), it is envisaged that the content of the signal information changes over time when the control state or the like of the vehicle changes, and such change will affect the correlation. Accordingly, in extracting the signal information from each of the plurality of pieces of communication data, the period (acquisition period) during in which the plurality of pieces of communication data are acquired is required to be a period during which there is substantially no change in the control state or the like of the vehicle. In this respect, if a plurality of pieces of communication data for extracting a plurality of pieces of signal information have been acquired within a predetermined period, the control unit generates the generated data using these pieces of signal information. Accordingly, it is possible to generate generated data and output the generated data to the monitoring ECU, while ensuring the correlation between the plurality pieces of the extracted signal information.

In a relay device according to an aspect of the present disclosure, the signal information includes a physical quantity or a state quantity relating to control of the vehicle.

According to such an aspect, the signal information included in the communication data includes a physical quantity (a sensor value: a vehicle speed, a battery temperature, or the like) relating to the control of a vehicle or a state quantity (an actuator state: an engine rotation speed, a steering wheel rotation angle, or the like). Accordingly, based on the correlation for the content of the signal information corresponding to the control state of the vehicle, the monitoring ECU can determine whether the acquired communication data is unauthorized data.

An information processing method according to an aspect of the present disclosure is an information processing method executed by a computer mounted in a vehicle, and configured to be communicably connected to a plurality of in-vehicle ECUs and a monitoring ECU having a monitoring function for communication data transmitted and received between the in-vehicle ECUs, and perform control relating to relaying of the communication data transmitted and received between the in-vehicle ECUs, the method including: acquiring the communication data; extracting, from the acquired communication data, signal information used by the monitoring ECU to detect unauthorized data; and outputting, to the monitoring ECU, generated data generated based on the extracted signal information.

According to such an aspect, it is possible to provide an information processing method for causing a computer to function as a relay device configured to transmit effective information for a monitoring ECU to detect unauthorized data.

An in-vehicle system according to an aspect of the present disclosure is an in-vehicle system including: a relay device mounted in a vehicle, and configured to relay communication data transmitted and received between in-vehicle ECUs; and a monitoring ECU having a monitoring function for the communication data transmitted and received between the in-vehicle ECUs, wherein the relay device is configured to: extract signal information from the acquired communication data in accordance with a request signal acquired from the monitoring ECU; and output, to the monitoring ECU, generated data generated based on the extracted signal information.

According to such an aspect, it is possible to provide an in-vehicle system including a relay device configured to transmit effective information for a monitoring ECU to detect unauthorized data.

The present disclosure will be specifically described with reference to the drawings showing embodiments thereof. A relay device 2 according to an embodiment of the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

Figure 2:
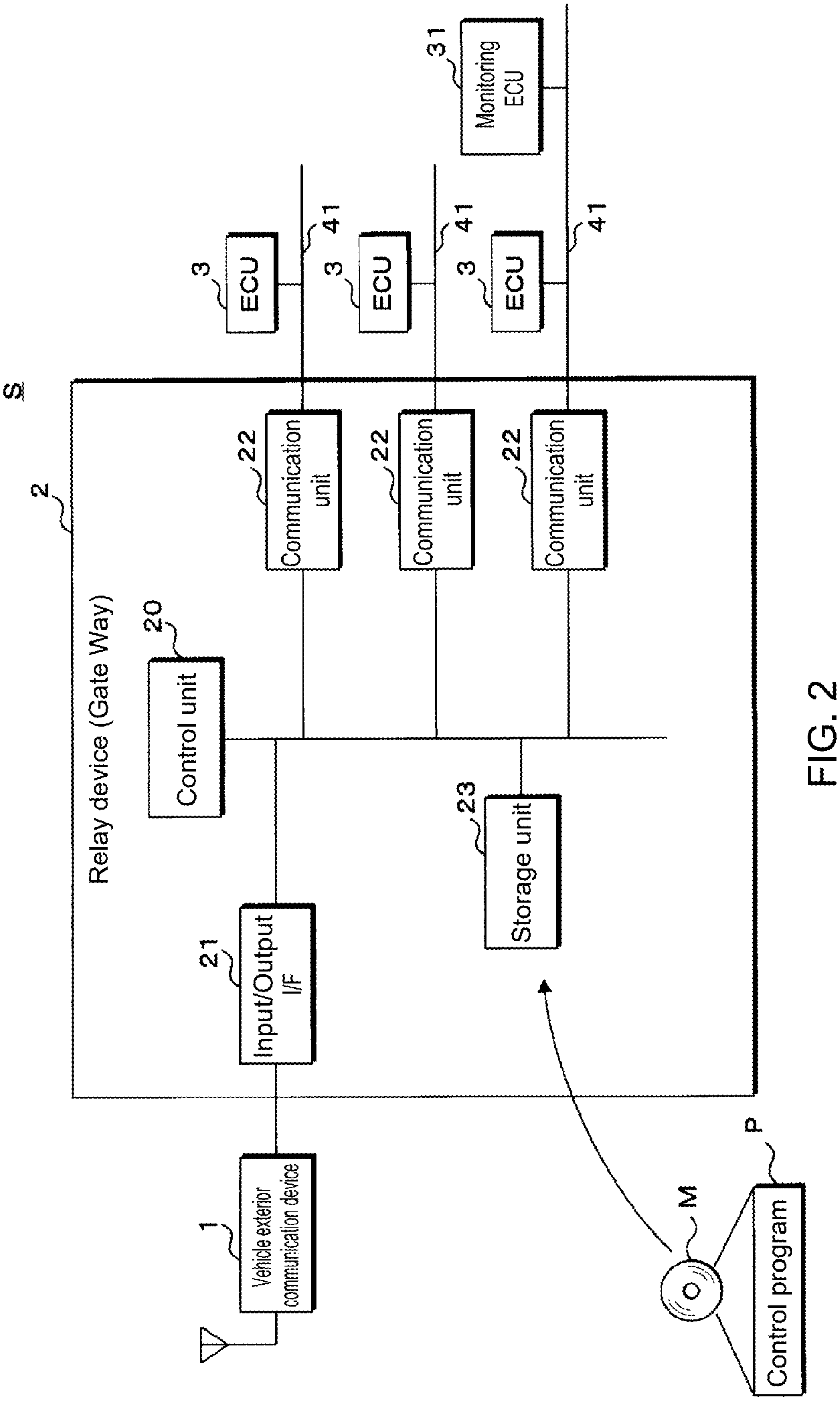

An embodiment will be described below with reference to the drawings. FIG. 1 is a schematic diagram illustrating a configuration of an in-vehicle system S including the relay device 2 according to Embodiment 1. FIG. 2 is a block diagram illustrating an internal configuration of the relay device 2 or the like. The in-vehicle system S includes the relay device 2, in-vehicle ECUs 3, and a monitoring ECU 31 that are mounted in a vehicle C. The relay device 2, the in-vehicle ECUs 3, and the monitoring ECU 31 are communicably connected via an in-vehicle network 4 composed of a plurality of communication lines 41.

The relay device 2 may configured to be further connected to a vehicle exterior communication device 1, and communicably connected to an external server S1 via the vehicle exterior communication device 1. The external server S1 is, for example, a computer such as a server connected to a vehicle exterior network N such as the Internet or a public network, and includes a storage unit formed by a Random Access Memory (RAM), a Read Only Memory (ROM), or a hard disk.

The vehicle exterior communication device 1 is a communication device for performing wireless communication using a mobile communication protocol such as 4G, LTE, 5G, or WiFi, and transmits and receives data to and from the external server S1 via an antenna. Communication between the vehicle exterior communication device 1 and the external server S1 is performed via, for example, an external network such as a public network or the Internet.

The relay device 2 includes a control unit 20, a storage unit 23, an input/output I/F 21, and communication units 22. The relay device 2 is a gateway that performs centralized control of, for example, a plurality of system buses (segments) such as an in-vehicle ECU 3 of a control system, an in-vehicle ECU 3 of a safety system, and an in-vehicle ECU 3 of a body system, and relays communication between the in-vehicle ECUs 3 of these buses (segments). That is, the communications line 41 respectively constituting the plurality of buses (segments) are connected to the relay device 2, and the plurality of communication lines 41 (segments) aggregated by the relay device 2 form the in-vehicle network 4. The relay device 2 functions as a CAN gateway in relaying using a Controller Area Network (CAN) or CAN-FD protocol, and functions as a Layer2 switch or a Layer 3 switch in relaying using a TCP/IP protocol. The relay device 2 may be a Power Lan Box (PLB) that also functions as a power distribution device that distributes and relays power that has been output from a power supply device such as a secondary battery, and supplies the power to an in-vehicle device such as an actuator connected to the device itself, in addition to performing relaying related to related to communication. Alternatively, the relay device 2 may be configured as a functional unit of a body ECU that performs overall control of the vehicle C. Alternatively, the relay device 2 may be an integrated ECU that is formed by a central control device such as a vehicle computer, and performs overall control of the vehicle C.

The control unit 20 is formed by a Central Processing Unit (CPU), a Micro Processing Unit (MPU), or the like, and is configured to perform various types of control processing and arithmetic processing by reading out and executing a control program P (program product) and data stored in advance in the storage unit 23.

The storage unit 23 is formed by a volatile memory device such as a Random Access Memory (RAM), a Read Only Memory (ROM), or an Electrically Erasable Programmable ROM (EEPROM), or a nonvolatile memory device such as a flash memory. The control program P (program product) stored in the storage unit 23 may be a control program P (program product) read out from a recording medium M that can be ready by the relay device 2. Also, the control program P may be a control program P downloaded from an external computer (not shown) connected to a communication network (not shown) and stored in the storage unit 23.

The input/output I/F 21 may be a communication interface for performing serial communication, for example. The relay device 2 may be communicably connected to the vehicle exterior communication device 1, or a display device such as a Human machine interface (HMI) device via the input/output I/F 21.

Each of the communication units is, for example, an input/output interface using a communication protocol such as CAN, CAN-FD, or Ethernet (registered trademark), and the control unit 20 mutually communicates, via the communication unit 22, with the in-vehicle ECUs 3 and other in-vehicle devices, such as the relay device 2, that are connected to the in-vehicle network 4. A plurality of (three in the present embodiment) communication units 22 are provided, and the communication lines 41 (segments) constituting the in-vehicle network 4 are respectively connected to the communication units 22. By providing a plurality of communication units 22 in this manner, the in-vehicle network 4 is divided into a plurality of segments, and the individual in-vehicle ECUs 3 are connected to the respective segments according to the functions (control-system function, safety-system function, body-system function) of the in-vehicle ECUs 3, for example.

Similarly to the relay device 2, each of the in-vehicle ECUs 3 includes a control unit, a storage unit, and a communication unit (not shown). A state quantity sensor that detects a state quantity indicating a state relating to the travel of the vehicle C, such as an engine rotation speed, a motor rotation speed, a steering wheel rotation angle, or an acceleration, is connected to each of the in-vehicles ECU 3. Each of the in-vehicle ECUs 3 outputs (transmits), to another in-vehicle ECU 3 via the in-vehicle network 4, communication data in which the sensor value (state quantity) obtained from the state quantity sensor is stored in a payload. The state quantity or the like included in the communication data (stored in the payload) in this manner corresponds to the signal information.

Similarly to the in-vehicle ECUs 3 or the relay device 2, the monitoring ECU 31 includes a control unit, a storage unit, and a communication unit (not shown). The monitoring ECU 31 functions as an Intrusion Detection System (IDS) that determines whether communication data (communication data to be monitored) acquired (received) by the ECU itself (monitoring ECU 31) is unauthorized data, and detects an intrusion by an unauthorized program or device into the in-vehicle network 4 to which the relay device 2 and the in-vehicle ECUs 3 are connected. The details of the determination processing performed by the monitoring ECU 31 for the communication data to be monitored will be described later.

Figure 3:
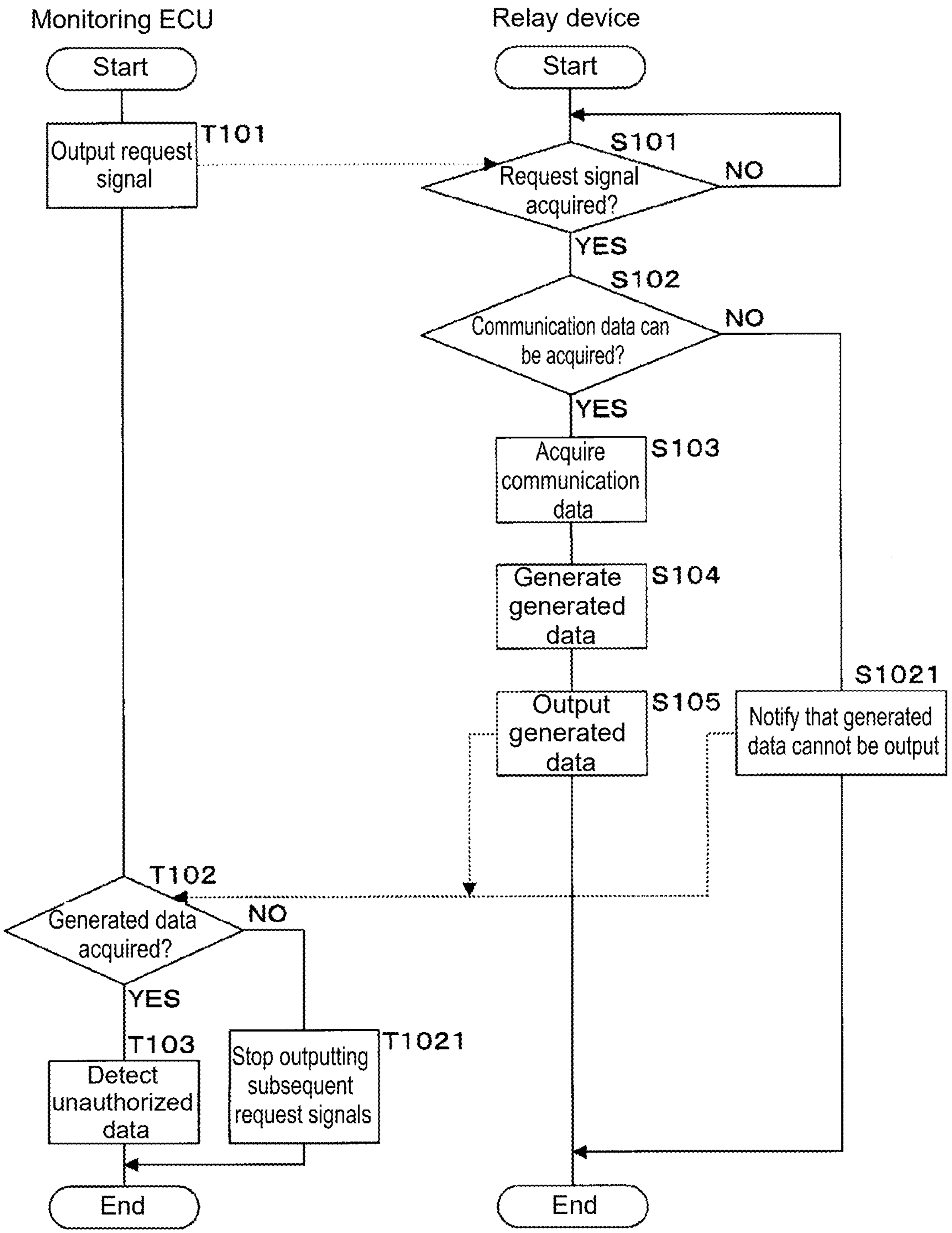
FIG. 3 is a flowchart illustrating processing performed by a control unit of the relay device.

FIG. 3 is a flowchart illustrating processing performed by the control unit 20 of the relay device 2. The control unit 20 of the relay device 2 and the control unit of the monitoring ECU 31 constantly perform the following processing when the vehicle C is in an activated state (IG switch is on) or a stopped state (IG switch is off).

The control unit 20 of the relay device 2 determines whether a request signal has been acquired (S101). If no request signal has been obtained (S101: NO), the control unit 20 of the relay device 2 performs loop processing to perform the processing in S101 again. By performing the loop processing, the control unit 20 of the relay device 2 continues processing for waiting for a request signal output (transmitted) from the monitoring ECU 31.

If a request signal has been acquired (S101: YES), the control unit 20 of the relay device 2 determines whether communication data including signal information to be extracted can be acquired (S102). The request signal output (transmitted) from the monitoring ECU 31 includes signal information to be extracted, and information related to the type (message ID or the like) of the communication data including the signal information. For example, when the communication data is a CAN message, the request signal includes a CAN-ID (message ID), and a bit address (storage bit address) or a block number or the like where the signal information to be extracted is stored in a payload included in a CAN message of the CAN-ID. In this manner, the signal information to be extracted is specified using a combination of a CAN-ID and a storage bit address.

The communication data is not limited to a CAN message, and may be an IP packet (TCP/IP). In this case, the type of the communication data may be a TCP port number, an UDP port number, a transmission source address, or a transmission destination address included in the header of the IP packet, or a combination thereof. In addition, the signal information to be extracted is specified by a storage bit address where the signal information is stored in a payload included in the IP packet. In this manner, a request signal output (transmitted) from the monitoring ECU 31 includes information (e.g., the type and the storage bit address or the like of the communication data) for specifying the signal information to be extracted.

The control unit 20 of the relay device 2 determines whether the communication data (communication data including the signal information to be extracted) specified based on the acquired request signal can be acquired (received). It is envisaged that the relay device 2 cannot receive the type (message ID or the like) of the communication data specified based on the acquired request signal communication data. In this respect, the relay device 2 determines whether the type (message ID or the like) of the communication data specified based on the request signal can be acquired, for example, by referring to route information (routing table) stored in the storage unit 23.

In the route information (routing table), pieces of information used by the control unit 20 of the relay device 2 when performing relay processing are listed. The pieces of information include, for example, type (message ID or the like) of communication data to be relayed, and the device number (segment number) of a communication unit 22 as a relay destination. In this manner, the route information includes information relating to the type (message ID or the like) of the communication data received by the control unit 20 of the relay device 2.

If the type (message ID or the like) of the communication data specified based on the acquired request signal is included in the route information, the control unit 20 of the relay device 2 determines that the communication data including the signal information to be extracted can be acquired. If the type (message ID or the like) of the communication data specified based on the acquired request signal is not included in the route information, the control unit 20 of the relay device 2 determines that the communication data including the signal information to be extracted cannot be acquired. Alternatively, the storage unit 23 of the relay device 2 may store a signal receivability table in which a feasibility flag indicating receivability is set for each piece of the signal information to be extracted that is requested by a request signal. In addition, the control unit 20 of the relay device 2 may determine whether the communication data including the signal information to be extracted can be acquired, by referring to the signal receivability table.

If the communication data can be acquired (S102: YES), the control unit 20 of the relay device 2 acquires the communication data in accordance with the request signal (S103). The request signal includes one or more pieces of signal information, and the control unit 20 of the relay device 2 acquires one or more pieces of communication data that have been specified, in accordance with the request signal. The control unit 20 of the relay device 2 steadily performs, via a plurality of communication units 22, relay processing for the communication data transmitted and received between the in-vehicle ECUs 3 respectively connected to the communication units 22. The control unit 20 of the relay device 2 acquires, from among pieces of the communication data received during the relay processing, the communication data (communication data including signal information) specified based on the request signal as data to be subjected to the processing. For example, when three pieces of signal information are requested by the request signal, the control unit 20 of the relay device 2 may acquire three pieces of communication data respectively including these pieces of signal information.

The control unit 20 of the relay device 2 generates generated data based on the acquired communication data (S104). For example, when the communication data is a CAN message, the control unit 20 of the relay device 2 extracts the value or the content of the signal information from the acquired communication data (CAN message), based on a combination (information for specifying signal information to be extracted) of the CAN-ID and the storage bit address included in the request signal. A single piece or a plurality of pieces of extracted signal information are compared with the signal information (determination target signal information) included in communication data that is to be monitored (to be determined whether it is unauthorized data) by the monitoring ECU 31, and thus are used to determine the suitability of the determination target signal information. That is, the monitoring ECU 31 determines whether the communication data acquired by the ECU itself (monitoring ECU 31) is unauthorized data, using another signal information having a correlation with the signal information included in that communication data, and the signal information extracted by the control unit 20 of the relay device 2 corresponds to the other signal information.

The expression that these pieces of signal information having a correlation may mean that the absolute value of a correlation coefficient between the determination target signal information and the signal information extracted by the control unit 20 of the relay device 2 may be greater than or equal to a predetermined value, including, for example, a value of 0.7 or more. To further increase the estimation accuracy, it is preferable that the predetermined value is 0.9. More preferably, the predetermined value is 0.97. The correlation coefficient can be calculated using, for example, the mathematical expression (Correlation coefficient=Covariance between a value of first data included in a plurality of pieces of data and a value of second data other than the first data included in the plurality pieces of data/(Standard deviation of the value of the first data×Standard deviation of the value of the second data)). By setting the absolute value of each of the correlation coefficients to be greater than or equal to the predetermined value, it is possible to extract a plurality of pieces of data having state quantities with a high correlation with each other in a positive or negative correlation. If the second data has a high correlation with the first data, the correlation coefficient takes a negative (minus) value. However, by multiplying this value by −1, this second data can be used as second data having a positive correlation.

The control unit 20 of the relay device 2 generates the generated data, using one or more pieces of signal information extracted from one or more pieces of communication data acquired in accordance with the request signal. Each piece of the extracted signal information is stored in the payload of the generated data. The request signal may include a storage bit address or the like used for storing the extracted plurality pieces of signal information in the payload region. In this case, based on the storage bit address, the control unit 20 of the relay device 2 stores the plurality pieces of signal information in the payload region. The request signal may include a message ID (CAN-ID), a port number, or the like included in the header of the generated data. In this case, the control unit 20 of the relay device 2 generates the generated data so as to include the message ID or the like in the header. In this manner, in including the extracted signal information in the generated data, the request signal includes header information (message ID or the like) and a frame format (storage bit address or the like used when storing signal information in the payload) of the generated data. In addition, the control unit 20 of the relay device 2 generates the generated data in accordance with the format specified by the request signal, and transmits the generated data to the monitoring ECU 31. Accordingly, it is possible to flexibly meet the specifications or the like of the monitoring ECU 31, thus supporting various types of monitoring ECUs 31 for a general-purpose use.

The control unit 20 of the relay device 2 outputs the generated data that has been generated to the monitoring ECU 31 (S105). The control unit 20 of the relay device 2 outputs, to the monitoring ECU 31 via the in-vehicle network 4, the generated data that has been generated in accordance with the request signal from the monitoring ECU 31. The monitoring ECU 31 that has acquired (received) the generated data output (transmitted) from the relay device 2 compares the one or more pieces of signal information included in the generated data with the signal information (determination target signal information) included in the communication data to be monitored acquired by the ECU itself (monitoring ECU 31), thereby determining the suitability of the determination target signal information.

If the communication data cannot be acquired (S102: NO), the control unit 20 of the relay device 2 notifies the monitoring ECU 31 that the generated data cannot be output (S1021). If the communication data cannot be acquired, or in other words, if the type of the communication data is not included in the group of types of communication data that is to be received, the communication data including the signal information specified by the request signal is communication data that is not to be received. Accordingly, the control unit 20 of the relay device 2 generates a signal (non-extractable signal) indicating that the generated data including the signal information cannot be output. Also, the control unit 20 of the relay device 2 may notify the monitoring ECU 31 by outputting the non-extractable signal.

Although S101 and S102 are described as being sequential processes in the present embodiment, the present disclosure is not limited thereto. If it is determined that a request signal has been acquired (S101: YES), the control unit 20 of the relay device 2 may generate a sub-process for performing the processing from S102 to S105, thereby performing the request signal acquisition processing (S101) and the processing for generating and outputting the generated data (S102 to S105) in parallel.

The control unit of the monitoring ECU 31 outputs a request signal (T101). For example, if the communication data to be monitored has been acquired (received), the control unit of the monitoring ECU 31 generates a request signal including information (message ID, and storage bit address or the like) specifying one or more pieces of signal information, and outputs the information to the relay device 2. Alternatively, the control unit of the monitoring ECU 31 may periodically or steadily generate and output the request signal.

The control unit of the monitoring ECU 31 determines whether the generated data has been acquired (T102). The control unit of the monitoring ECU 31 continues the processing for waiting for the generated data from the relay device 2, and, if the generated data has been output from the relay device 2, the control unit acquires the generated data.

If the generated data has been acquired (T102: YES), the control unit of the monitoring ECU 31 uses the acquired generated data to detect unauthorized data (T103). If the generated data from the relay device 2 has been acquired, the control unit of the monitoring ECU 31 extracts one or more pieces of signal information included in the payload of the generated data. Based on the extracted signal information, the control unit of the monitoring ECU 31 derives an estimate value corresponding to the determination target signal information.

The control unit of the monitoring ECU 31 compares the derived estimate value with the determination target signal information, and determines the suitability of the determination target signal information based on the result of comparison. For example, the control unit of the monitoring ECU 31 may determine that the determination target signal information is authorized if the difference between the content (value) of the determination target signal information and the derived estimate value is within a predetermined value, and determines that the determination target signal information is unauthorized if the above-described difference exceeds the predetermined value. If it is determined that the determination target signal information is authorized, the communication data to be monitored is authorized. If it is determined that the determination target signal information is unauthorized, the communication data to be monitored is determined to be unauthorized.

Even if the monitoring ECU 31 cannot directly acquire (receive) the communication data including the signal information in this manner, the monitoring ECU 31 can acquire the signal information by acquiring the generated data, thus making it possible to efficiently achieve the monitoring function for the communication data to be monitored.

If the generated data has not been acquired (T102: NO), or in other words, if a notification that the generated data cannot be output has been received (acquired), the control unit of the monitoring ECU 31 stops outputting subsequent request signals (T1021). If the generated data has not been acquired, the control unit of the monitoring ECU 31 acquires a notification that generated data cannot be output (receives a non-extractable signal). Since the control unit of the monitoring ECU 31 that has received the non-extractable signal stops outputting a request signal to the relay device 2, the output of request signals will not be performed thereafter. Thus, the processing load of the relay device 2 can be reduced.

Embodiment 2

Figure 4:
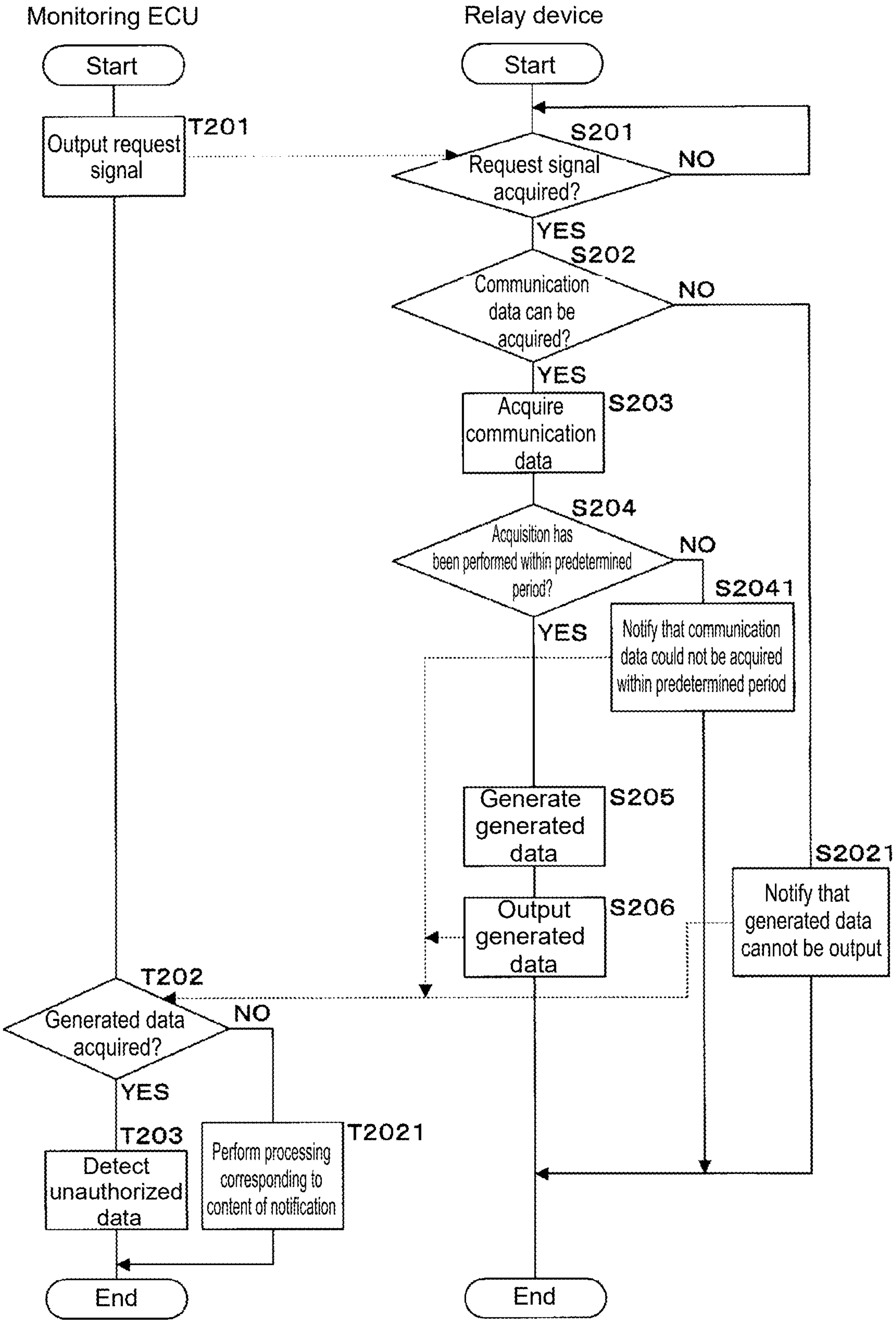
FIG. 4 is a flowchart illustrating processing performed by a control unit of a relay device according to Embodiment 2 (signal acquisition within a predetermined period).

FIG. 4 is a flowchart illustrating processing performed by a control unit 20 of a relay device 2 according to Embodiment 2 (signal acquisition within a predetermined period). As in the case of Embodiment 1, the control unit 20 of the relay device 2 and a control unit of a monitoring ECU 31 constantly perform the following processing when a vehicle C is in an activated state (IG switch is on) or a stopped state (IG switch is off). The control unit 20 of the relay device 2 performs the processing from S201 to S203, as in the case of the processing from S101 to S103 in Embodiment 1.

The control unit 20 of the relay device 2 determines whether all the communication data for extracting all the signal information requested by a request signal has been acquired within a predetermined period (S204). Even in the case where the types of pieces of signal information included in the communication data are the same (the same CAN-ID and the same storage bit address), it is envisaged that the content or the value or the like of the signal information changes over time when the control state or the like of the vehicle C changes, and such change will affect the correlation. The physical quantity or the state quantity relating to the control of the vehicle C is, for example, a physical quantity constituted by a sensor value such as a vehicle speed or a battery temperature, or a state quantity indicating an actuator state such as a rotation speed or a steering wheel rotation angle.

In this manner, the signal information included in the communication data includes a physical quantity or a state quantity relating to the control of the vehicle C, and it is therefore envisaged that the content of the signal information corresponding to the control state of the vehicle C changes over time. Accordingly, in extracting the signal information from each of a plurality of pieces of communication data, the period (acquisition period) in which the plurality of pieces of communication data are acquired is required to be within a period during which there is substantially no change in the control state or the like of the vehicle C, and is also required to be at the same time as the point of time (reception time point) at which the communication data to be monitored by the monitoring ECU 31 is acquired. In the present embodiment, "the same time" is not limited to cases where these acquisition time points perfectly coincide, and is intended to mean that the acquisition time points may be in the same period in an allowable range in terms of the accuracy of determination performed by the monitoring ECU 31.

For example, the control unit 20 of the relay device 2 determines whether all the communication data for extracting all the signal information requested by the request signal has been acquired within a predetermined period, based on the value of the predetermined period stored in advance in the storage unit 23 as the reception time point of the request signal as a starting point of calculation. Alternatively, the value of the predetermined period may be included in the request signal. In this case, the control unit 20 of the relay device 2 determines whether all the communication data for extracting the signal information have been acquired within the predetermined period, based on the predetermined period included in the request signal. In determining whether all the communication data have been acquired within the predetermined period, the control unit 20 of the relay device 2 may determine whether the period (acquisition period) required to receive all the communication data is within the predetermined period. Alternatively, the control unit 20 of the relay device 2 may perform the aforementioned determination by determining whether the communication data acquired (received) within the predetermined period satisfies all the communication data for extracting all the signal information requested by the request signal.

If the above-described acquisition has been performed within the predetermined period (S204: YES), the control unit 20 of the relay device 2 performs the processing from S205 to S206 as in the case of the processing from S104 to S105 in Embodiment 1. Thus, as in the case of Embodiment 1, the control unit 20 of the relay device 2 generates and outputs the generated data.

If the above-described acquisition has not been performed within the predetermined period (S204: NO), all the signal information for extracting all the communication data requested by the request signal could not be acquired within the predetermined period. Accordingly, the control unit 20 of the relay device 2 outputs, to the monitoring ECU 31, a notification that the generated data cannot be output (S2041). If the above-described acquisition has not been performed within the predetermined period, the control unit 20 of the relay device 2 may generate a signal (intra-period non-acquirable signal) indicating that all the communication data for extracting the signal information could not be acquired within the predetermined period, and notify the monitoring ECU 31 to that effect by outputting the intra-period non-acquirable signal thereto.

As in the case of the processing from T101 to T102 in Embodiment 1, the control unit of the monitoring ECU 31 performs the processing from T201 to T202. As in the case of Embodiment 1, if the generated data has been acquired (T202: YES), the control unit of the monitoring ECU 31 uses the acquired generated data to detect unauthorized data (T203).

If the generated data has not been acquired (T202: NO), or in other words, if a notification (non-extractable signal) that the generated data cannot been output, or a notification (intra-period non-acquirable signal) that the communication data cannot be acquired within the predetermined time has been received (acquired), the control unit of the monitoring ECU 31 performs the processing corresponding to the content of the notification (T2021). If a notification (non-extractable signal) that the generated data cannot be output has been received (acquired), the control unit of the monitoring ECU 31 may stop outputting subsequent request signals as in the case of T1021 of Embodiment 1.

If a notification (intra-period non-acquirable signal) that the communication data cannot be received (acquired) within the predetermined time, the generated data could not be acquired from the relay device 2. Accordingly, the control unit of the monitoring ECU 31 may store, in the storage unit of the monitoring ECU 31, a processing result indicating that the determination processing for the currently acquired (received) communication data to be monitored could not be performed, in association with the reception time point of the communication data to be monitored. Alternatively, if a notification (intra-period non-acquirable signal) that the communication data cannot be acquired within the predetermined time has been received (acquired), the control unit of the monitoring ECU 31 may perform loop processing in order to perform the processing from T201 again.

When the control unit of the monitoring ECU 31 performs the determination processing for the communication data to be monitored, the signal information included in the generated data acquired from the relay device 2 and the signal information included in the communication data to be monitored have a temporal correlation that their reception time points (reception periods) are substantially the same. This makes it possible to increase the accuracy of the determination processing performed by the control unit of the monitoring ECU 31.

Embodiment 3

Figures 5, 6:
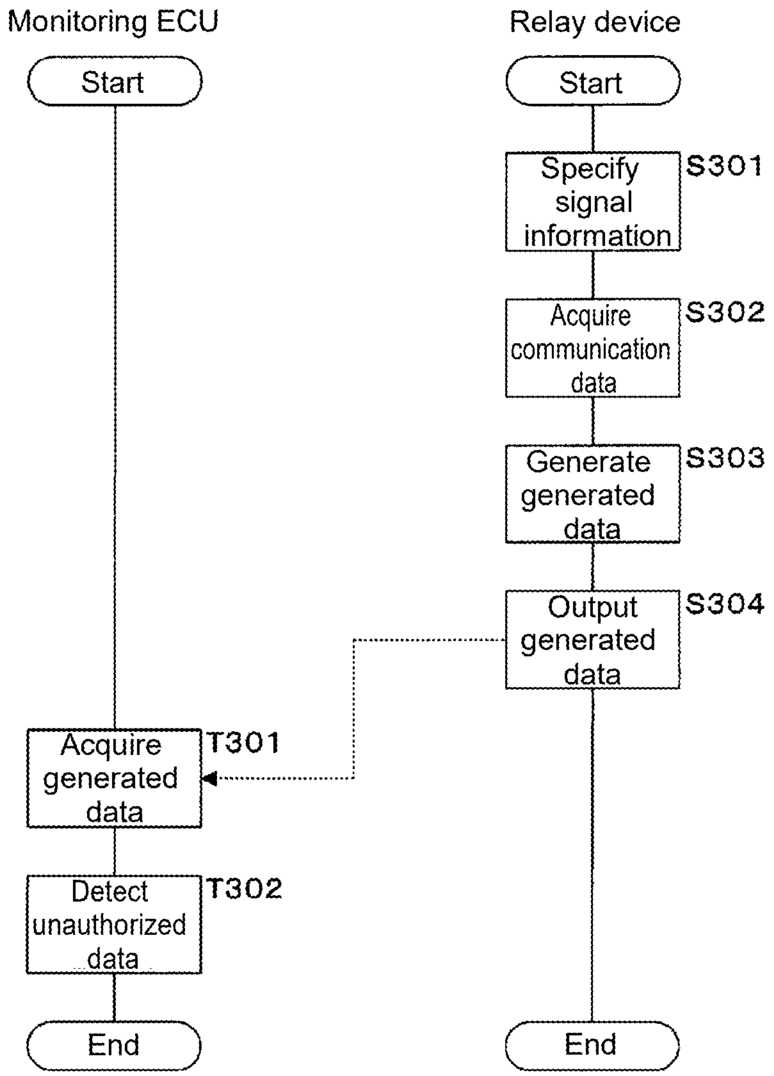
FIG. 5 is a flowchart illustrating processing performed by a control unit of a relay device according to Embodiment 3 (signal specification using a correlation table).
FIG. 6 is an explanatory diagram illustrating a correlation table.

FIG. 5 is a flowchart illustrating processing performed by a control unit 20 of a relay device 2 according to Embodiment 3 (signal specification using a correlation table). As in the case of Embodiment 1, the control unit 20 of the relay device 2 and a control unit of a monitoring ECU 31 constantly perform the following processing when a vehicle C is in an activated state (IG switch is on) or a stopped state (IG switch is off).

The control unit 20 of the relay device 2 specifies signal information to be extracted (S301). The control unit 20 of the relay device 2 specifies the signal information by referring to a correlation table stored in an accessible storage area, including, for example, a storage unit 23 of the relay device 2, without acquiring the request signal described in Embodiment 1.

FIG. 6 is an explanatory diagram illustrating the correlation table. The correlation table stores, in the form of, for example, a list (table), signal information to be extracted according to the monitoring ECU 31. The correlation table includes, as management items (fields), a monitoring ECU ID, a segment number, a transmission periodicity, and a signal to be extracted, for example.

As the management item "monitoring ECU ID", an identifier (ID) for uniquely specifying each of a plurality of monitoring ECUs 31 is included in an in-vehicle system S. As the management item "segment number", the segment number of a communication line 41 to which the corresponding monitoring ECU 31 (monitoring ECU ID) is connected is stored. The segment number of a communication line 41 corresponds to the device number of a communication unit 22 of the relay device 2 to which that communication line 41 is connected. As the management item "transmission periodicity", the transmission periodicity with which the generated data is transmitted (output) to the corresponding monitoring ECU 31 (monitoring ECU ID) is stored.

As the management item "signal to be extracted", the type of communication data used by the corresponding monitoring ECU 31 (monitoring ECU ID) when determining the signal information included in the communication data to be monitored, and the signal information (information specifying the signal information to be extracted) included in the communication data is stored. When the communication data is a CAN message, the type of the communication data and the signal information may be defined by, for example, a CAN-ID (message ID), and the storage bit address where the signal information to be extracted is stored in the payload included in the CAN message with the CAN-ID. The control unit 20 of the relay device 2 can specify the signal information required for the determination processing for the individual monitoring ECUs 31 and the type of the communication data including such signal information by referring to the correlation table.

The control unit 20 of the relay device 2 performs the processing from S302 to S304 as in the case of the processing from S103 to S105 in Embodiment 1. The control unit 20 of the relay device 2 generates generated data for each of the individual monitoring ECUs 31 by referring to the correlation table, and outputs each of the pieces of the generated data that have been generated to the corresponding monitoring ECU 31. In generating and outputting generated data for each of the monitoring ECUs 31, the control unit 20 of the relay device 2 may perform these processes according to the transmission periodicity defined in the correlation table for each of the monitoring ECUs 31. When the monitoring ECU 31 or the in-vehicle ECUs 3 have been reprogrammed using an update program transmitted from the external server S1, for example, the control unit 20 of the relay device 2 may update the correlation table according to the reprogramming performed using the update program.

The control unit of the monitoring ECU 31 acquires (receives) the generated data output (transmitted) from the relay device 2 (T301). The control unit of the monitoring ECU 31 continues the processing for waiting for the generated data from the relay device 2, and, if generated data has been output from the relay device 2, the control unit acquires the generated data. As in the case of T103 in Embodiment 1, the control unit of the monitoring ECU 31 uses the acquired generated data to detect unauthorized data (T302).

When the in-vehicle system S includes a plurality of monitoring ECUs 31, and the monitoring ECUs 31 are connected to their respective communication units 22 of the relay device 2, it is envisaged that the individual monitoring ECUs 31 monitor different types of communication data as monitoring targets. In this respect, pieces of signal information that are respectively required by the monitoring ECUs 31 to perform determination are defined in the correlation table.

The control unit 20 of the relay device 2 specifies the signal information to be extracted according to the monitoring ECU 31, based on the correlation table stored in an accessible storage area such as a storage unit 23, and extracts the specified signal information from the communication data acquired via the communication unit 22. In this manner, the control unit 20 of the relay device 2 can efficiently perform processing suitable for each of the monitoring ECUs 31 by referring to the correlation table.

It should be appreciated that the embodiments disclosed herein are to be construed in all respects as illustrative and not limiting. The scope of the present disclosure is defined by the claims, rather than by the description preceding them, and is intended to include all modifications which fall within the scope of the claims and the meaning and scope of equivalents thereof.

A plurality of claims recited in the claims can be combined with one another, regardless of the claims to which they refer. In the claims, a multiple dependent claim depending on a plurality of claims may be recited. A multiple dependent claim depending on a multiple dependent claim may be recited. Even in the case where no multiple dependent claim depending on a multiple dependent claim is recited, this does not limit the recitation of a multiple dependent claim depending on a multiple dependent claim.

The invention claimed is:

1. A relay device mounted in a vehicle and communicably connected to a plurality of in-vehicle electronic control units (ECUs), the relay device comprising:

a plurality of communication units configured to be connected to the plurality of in-vehicle ECUs; and a control unit configured to perform control relating to relaying of communication data transmitted and received between the plurality of in-vehicle ECUs via the plurality of communication units, wherein:

the plurality of in-vehicle ECUs include a monitoring ECU having a monitoring function for the communication data, the control unit is configured to:

acquire the communication data via the plurality of communication units;

extract, from the acquired communication data, signal information used by the monitoring ECU to detect unauthorized data; and output, to the monitoring ECU, generated data generated based on the extracted signal information, the monitoring ECU is configured to determine whether the acquired communication data is unauthorized data, using another signal information having a correlation with the signal information included in the communication data, wherein the signal information extracted by the control unit corresponds to the other signal information, and when a request signal has been acquired from the monitoring ECU, the control unit is configured to:

extract the signal information from the acquired communication data in accordance with the request signal, and output, to the monitoring ECU, the generated data generated based on the extracted signal information.

2. The relay device according to claim 1, wherein the control unit is configured to: determine, based on the acquired request signal, whether or not acquisition of communication data including the other signal information to be extracted is possible; if it is determined that the acquisition is possible, output the generated data to the monitoring ECU; and, if it is determined that the acquisition is not possible, notify the monitoring ECU that the generated data cannot be output.

3. The relay device according to claim 1, wherein the control unit is configured to: acquire a plurality of pieces of the communication data; extract the signal information from each of the plurality of pieces of the communication data; and generate the generated data based on the extracted plurality of pieces of the signal information.

4. The relay device according to claim 3, wherein, the control unit is configured to, if a plurality of pieces of the communication data for extracting the plurality of pieces of the signal information have been acquired within a predetermined period, generate the generated data based on the extracted plurality of pieces of the signal information.

5. The relay device according to claim 1, wherein the signal information includes a physical quantity or a state quantity relating to control of the vehicle.

6. The relay device according to claim 1, wherein the control unit is configured to: acquire a plurality of pieces of the communication data; extract the signal information from each of the plurality of pieces of the communication data; and generate the generated data based on the extracted plurality of pieces of the signal information.

7. The relay device according to claim 2, wherein the control unit is configured to: acquire a plurality of pieces of the communication data; extract the signal information from each of the plurality of pieces of the communication data; and generate the generated data based on the extracted plurality of pieces of the signal information.

8. The relay device according to claim 1, wherein the signal information includes a physical quantity or a state quantity relating to control of the vehicle.

9. The relay device according to claim 2, wherein the signal information includes a physical quantity or a state quantity relating to control of the vehicle.

10. An information processing method executed by a computer mounted in a vehicle, and configured to be communicably connected to a plurality of in-vehicle electronic control units (ECUs) and a monitoring ECU having a monitoring function for communication data transmitted and received between the in-vehicle ECUs, and perform control relating to relaying of the communication data transmitted and received between the in-vehicle ECUs, the method comprising:

acquiring the communication data;

extracting, from the acquired communication data, signal information used by the monitoring ECU to detect unauthorized data;

outputting, to the monitoring ECU, generated data generated based on the extracted signal information;

determining whether the acquired communication data is unauthorized data, using another signal information having a correlation with the signal information included in the communication data, wherein the signal information extracted by the control unit corresponds to the other signal information; and when a request signal has been acquired from the monitoring ECU:

extracting the signal information from the acquired communication data in accordance with the request signal, and outputting, to the monitoring ECU, the generated data generated based on the extracted signal information.

11. An in-vehicle system comprising:

a relay device mounted in a vehicle, and configured to relay communication data transmitted and received between in-vehicle electronic control unit (ECUs); and a monitoring ECU having a monitoring function for the communication data transmitted and received between the in-vehicle ECUs, wherein:

the relay device is configured to:

extract signal information from the acquired communication data in accordance with a request signal acquired from the monitoring ECU; and output, to the monitoring ECU, generated data generated based on the extracted signal information;

the monitoring ECU is configured to determine whether the acquired communication data is unauthorized data, using another signal information having a correlation with the signal information included in the communication data, wherein the signal information extracted by the relay delay corresponds to the other signal information, and when a request signal has been acquired from the monitoring ECU, the relay device is configured to:

extract the signal information from the acquired communication data in accordance with the request signal, and output, to the monitoring ECU, the generated data generated based on the extracted signal information.

* * * * *